United States Patent
Potier

(10) Patent No.: US 6,230,792 B1
(45) Date of Patent: May 15, 2001

(54) DEVICE FOR ATTACHING AN ACCESSORY TO A HEAT EXCHANGER

(75) Inventor: Michel Potier, Rambouillet (FR)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 09/163,668

(22) Filed: Sep. 30, 1998

(30) Foreign Application Priority Data

Oct. 2, 1997 (FR) .................................................. 97 12285

(51) Int. Cl.⁷ ...................................................... F28F 7/00
(52) U.S. Cl. ............................ 165/121; 165/135; 165/67; 123/41.49; 416/195; 180/68.4
(58) Field of Search ................................. 165/121, 41, 43, 165/67, 140, 135; 416/195; 123/41.49; 180/68.4

(56) References Cited

U.S. PATENT DOCUMENTS

| 1,791,924 | 2/1931 | Florman . | |
|---|---|---|---|
| 3,061,277 | 10/1962 | Anderson . | |
| 5,289,872 | * 3/1994 | Kent | ...................................... 165/133 |
| 5,348,079 | 9/1994 | Tanaka . | |
| 5,441,100 | 8/1995 | Ueda et al. . | |
| 5,522,457 | * 6/1996 | Lenz | ........................................ 165/121 |
| 5,597,038 | * 1/1997 | Potier | ..................................... 165/121 |
| 5,638,894 | * 6/1997 | Potier et al. | ........................... 165/121 |
| 5,771,961 | * 6/1998 | Alizadeh | ............................... 165/121 |
| 5,791,402 | * 8/1998 | Dumetz | ................................. 165/149 |
| 5,868,197 | * 2/1999 | Potier | ..................................... 165/121 |

FOREIGN PATENT DOCUMENTS

| 4232019 | * 10/1993 | (DE) | ...................................... 165/121 |
|---|---|---|---|
| 183596 | * 8/1985 | (EP) | ....................................... 165/121 |
| 0 724 071 | 7/1996 | (EP) . | |
| 82788 | * 5/1985 | (JP) | ....................................... 165/121 |

* cited by examiner

Primary Examiner—Ira S. Lazarus
Assistant Examiner—Terrell McKinnon
(74) Attorney, Agent, or Firm—Morgan & Finnegan LLP

(57) ABSTRACT

The invention relates to a unit comprising an accessory fixed to a heat exchanger comprising fins made of aluminum, this accessory being equipped with bearing surfaces designed to come to rest on the fins.

The bearing surfaces are formed on an accessory support made of steel integral with the accessory, and an electrically insulating material is placed between the bearing surfaces and the fins of the exchanger.

18 Claims, 3 Drawing Sheets

DEVICE FOR ATTACHING AN ACCESSORY TO A HEAT EXCHANGER

FIELD OF THE INVENTION

The present invention generally relates to a device for attaching an accessory to a heat exchanger.

BACKGROUND OF THE INVENTION

The mounting of an accessory directly on the core of a heat exchanger is known. For example French Patent Application 2730009 describes the attachment of the motor of a motor fan unit to the radiator for cooling the engine of a motor vehicle.

In this document, the cooling unit of the exchanger is clamped between two groups of bearing elements by screws which pass through said unit through recesses provided in the fins between the tubes. Distance sleeves also pass through the unit in these same recesses to avoid a crushing of the fins, and raised shapes slightly deform these fins during the tightening of the screws to avoid any sliding of the motor in relation to the unit of the exchanger.

On the side of the exchanger where the motor is situated, the bearing elements are formed in a flange made of plastic material which is integral with the body of the motor. The raised shapes are produced in this flange in particular.

This arrangement is generally satisfactory. However, it cannot be used when the operating temperature exceeds a certain limit allowable by the plastic material of the flange. In such a case one is induced to produce a motor support made of steel. But in this case it is no longer possible to fix the support directly onto the aluminium fins because the risk of corrosion and deterioration of the mechanical connection.

The present invention aims to reduce these difficulties.

SUMMARY OF THE INVENTION

According certain embodiments to the present invention there is provided a unit comprising an accessory fixed to a heat exchanger comprising fins made of metal, especially aluminium, the said accessory being equipped with bearing surfaces designed to come to rest on the said fins, wherein the said bearing surfaces are formed on a steel accessory support integral with the said accessory, and wherein an electrically insulating material is placed between the bearing surfaces and the fins of the exchanger.

As the accessory support is made from steel it withstands any desired operating temperature. Furthermore, the risk of corrosion is averted by the presence of the electrically insulating material placed between the bearing surfaces made of steel and the fins made of metal, especially aluminium.

In a first embodiment of the invention, the said material is made in the form of an electrically insulating coating, covering the said bearing surfaces.

This electrically insulating coating may be of the paint or varnish type, which is applied in the liquid state. It may also occur in the form of an adhesive bonded onto the bearing surfaces. In these two cases, gripping protrusions may be provided, for example by stamping, in the portion of the accessory support forming the bearing surfaces.

In another embodiment, the electrically insulating material is in the form of blocks made of plastic material fixed to the said bearing surfaces.

The attachment of the blocks to the bearing surfaces may be performed by latching means cooperating on the block and on the accessory support.

The blocks advantageously comprise gripping protrusions on their face facing the fins of the exchanger.

The blocks may also comprise a sleeve designed to engage in a recess provided in the fins of the exchanger between the tubes, so as to form at least one distance sleeve portion.

BRIEF DESCRIPTION OF DRAWINGS

Two preferred embodiments of the invention will now be described, as a non-restrictive example, with reference to the attached diagrammatical drawings in which.

DESCRIPTION OF THE PREFERRED EMBODIMENTS

Figure 1:
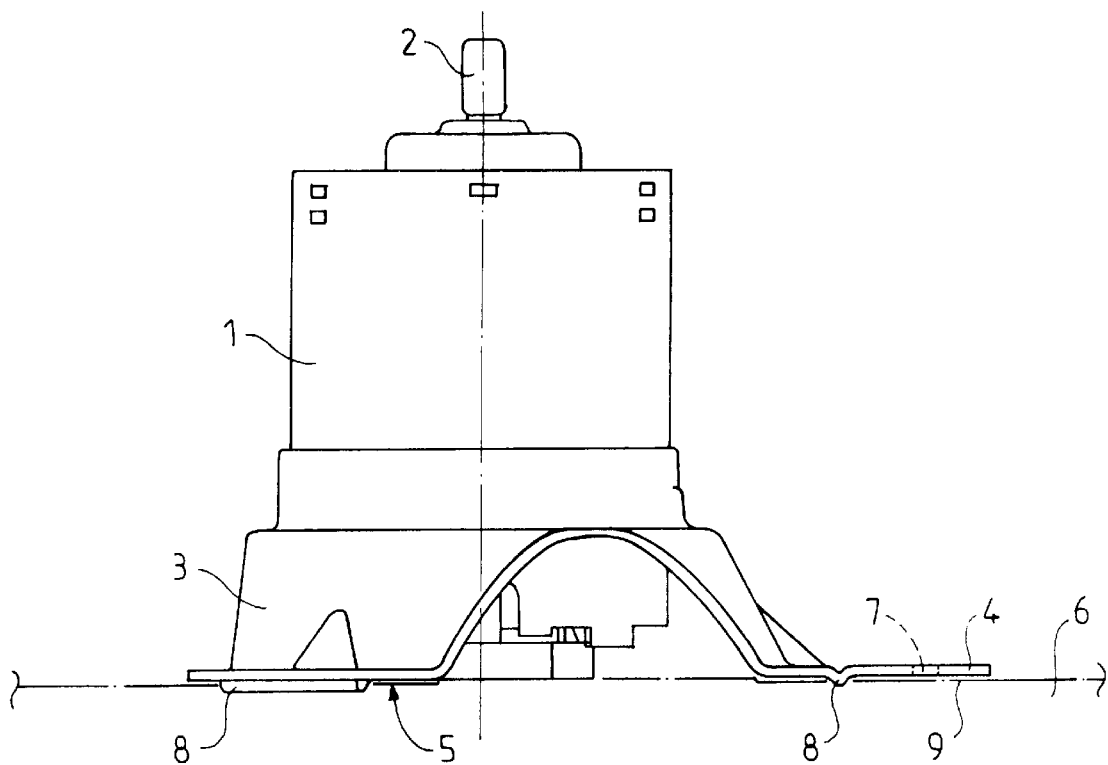
FIG. 1 is a front view of a motor of a motor fan unit fixed to a heat exchanger in accordance with a first embodiment of the invention.
Figure 2:
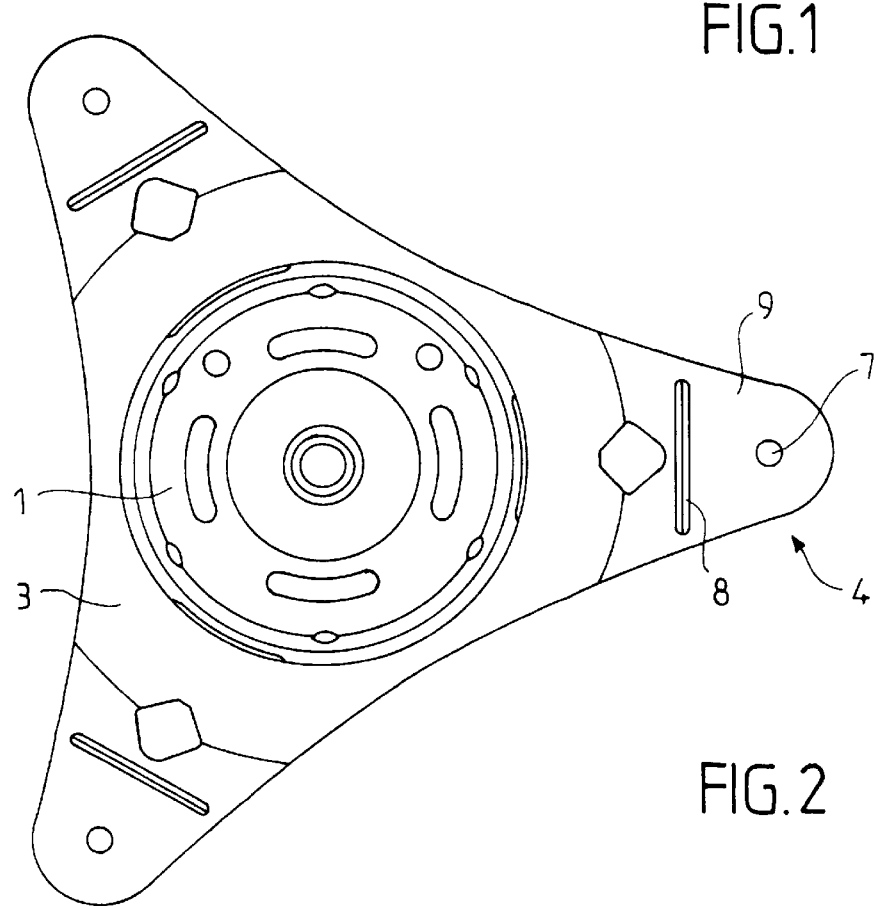
FIG. 2 is a side view of this motor turned towards the heat exchanger, said heat exchanger not being represented.
Figure 3:
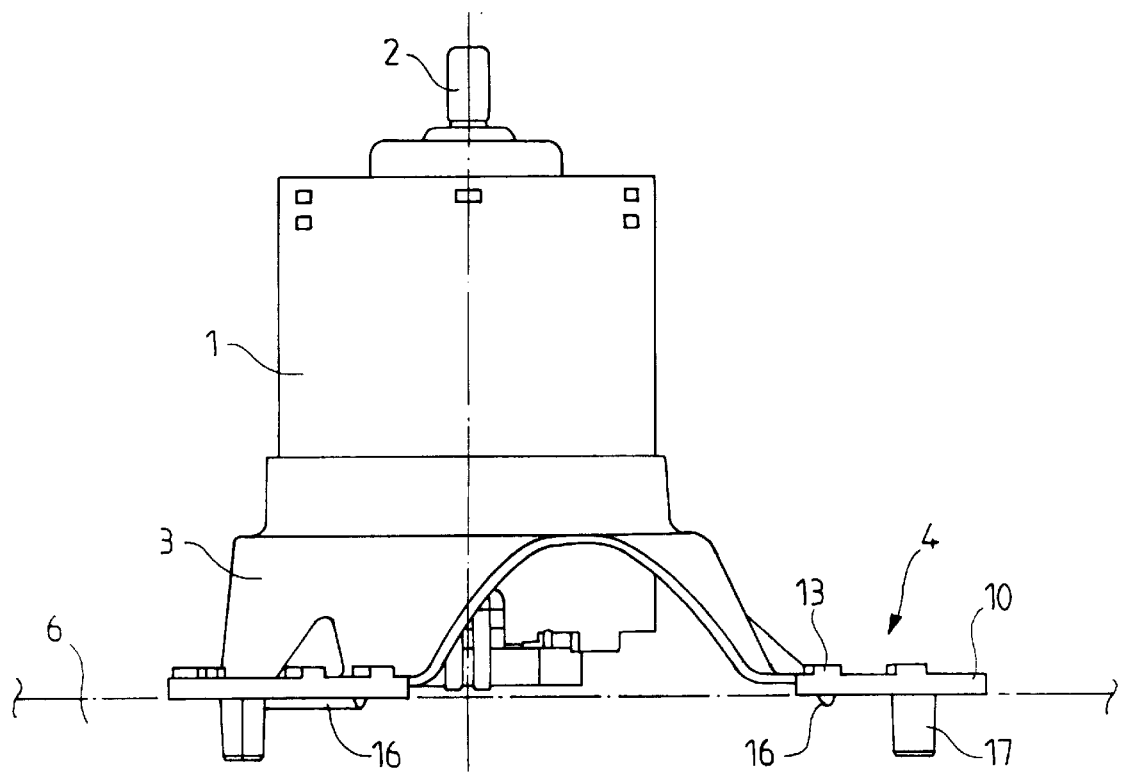
FIG. 3 is a front view of a motor of a motor fan unit fixed to a heat exchanger in accordance with a second embodiment of the invention.
Figure 4:
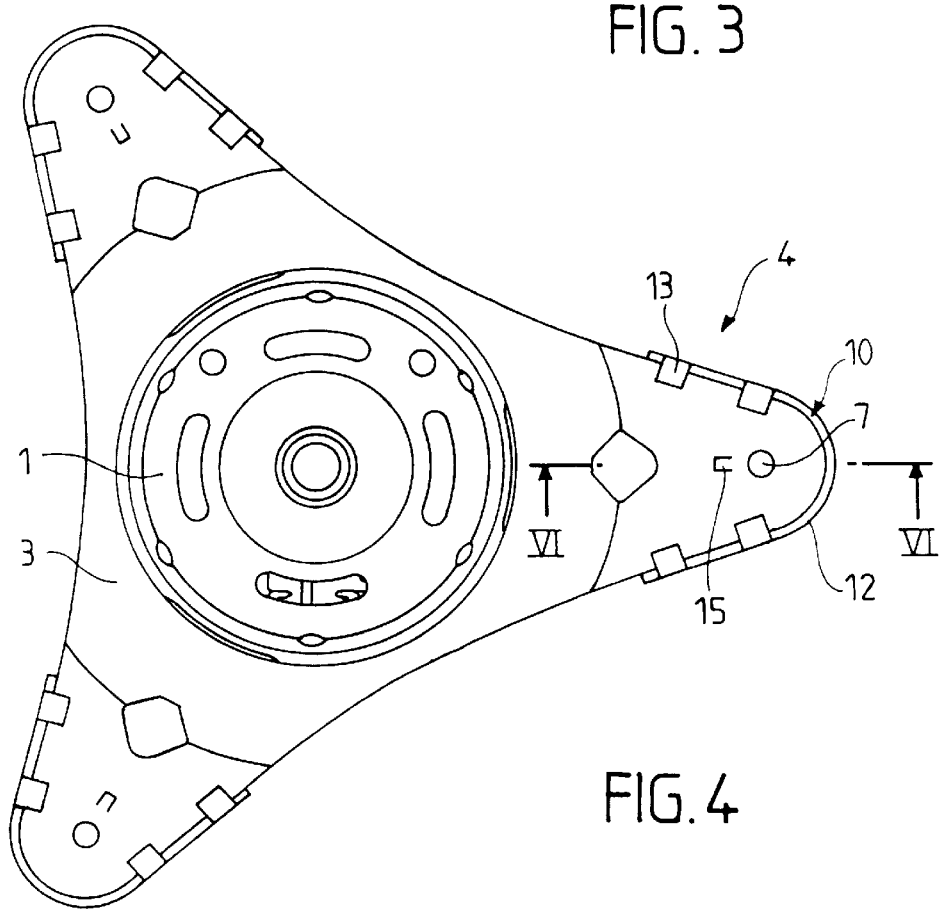
FIG. 4 is a view of this motor similar to FIG. 2.
Figure 5:
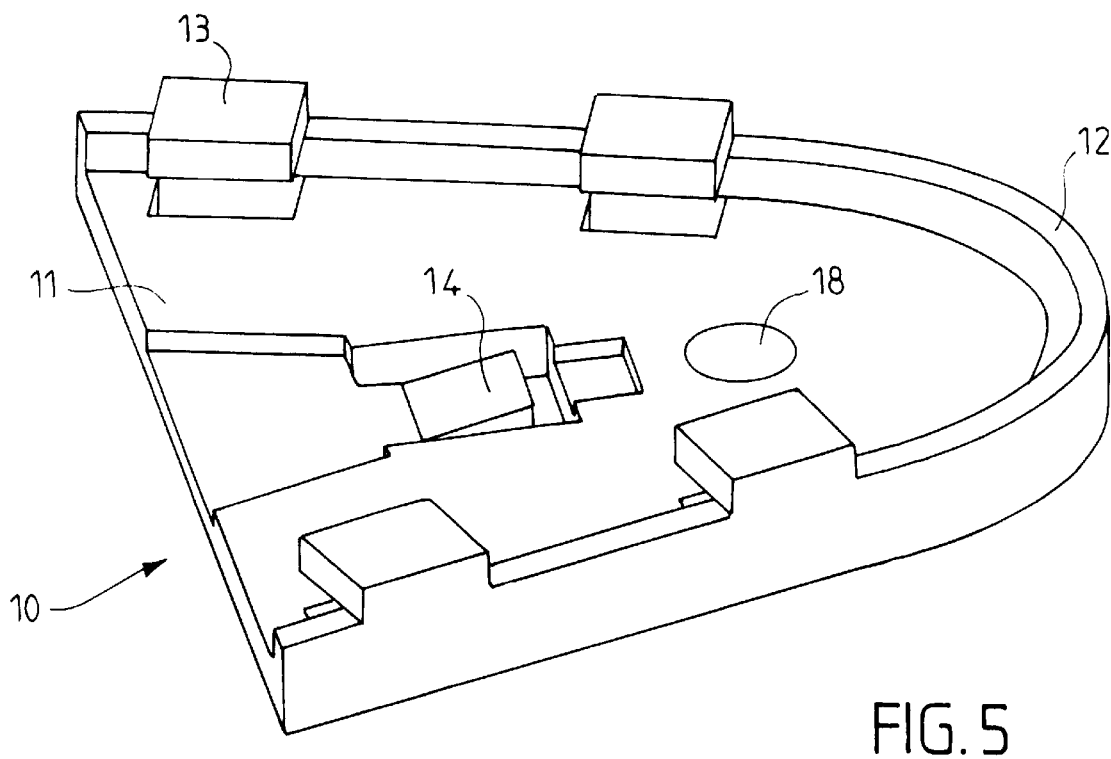
FIG. 5 is a perspective view on a larger scale of one of the blocks represented in FIGS. 3 and 4.
Figure 6:
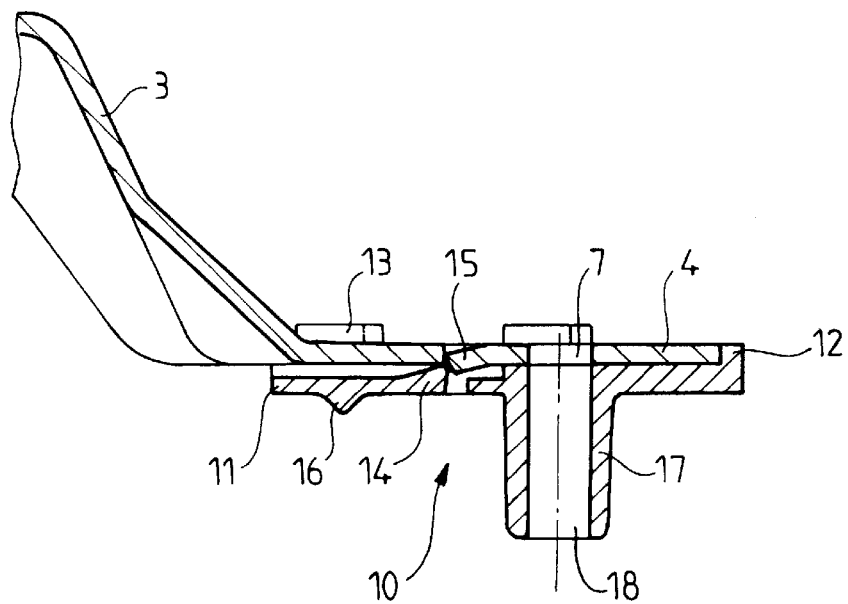
FIG. 6 is a sectional view along line VI—VI of FIG. 4.

On FIGS. 1 and 2 can be seen the electric motor 1 of a motor fan unit in which the fan, not represented, is designed to be mounted on the shaft 2 of the motor.

A motor support 3 is fixed to the motor 1 by any suitable means.

The support 3 comprises fastening lugs 4 forming bearing surfaces 5 for its mounting on a heat exchanger 6, for example the radiator of an engine of a motor vehicle. The support 3 is made from sheet steel, whereas the fins of the exchanger 6, alone in contact with the support 3, are made of aluminium.

The lugs 4 are drilled with holes 7 for the passage of screws (not represented). These screws allow the mounting of the motor 1 on the exchanger in a known manner, by means of distance sleeves.

Moreover, the sheet metal of the lugs 4 is stamped to form ribs 8 having a substantially triangular section. The ribs 8 protrude from the lugs 4 on the side of the bearing surfaces 5, facing the heat exchanger 6. Thus, when the motor support 3 is pressed onto the exchanger by the fixing screws, the ribs 8 penetrate whilst slightly deforming the fins of the exchanger, preventing any subsequent slipping of the motor in relation to the exchanger.

The bearing surfaces 5 in contact with the exchanger 6 are here covered with an electrically insulating coating 9. The coating 9 may be of any known type capable of being applied onto the steel, such as a paint or a varnish. Its application may more particularly be performed by spraying or by immersion.

The coating, by virtue of its electrical insulating nature, decreases the risks of corrosion, which otherwise would be associated with the contact between the steel of the motor support 3 and the aluminium of the fins of the exchanger 6, to be averted.

In the embodiments of FIGS. 3 to 6, the ends of the fastening lugs 4, which rest on the fins of the heat exchanger 6, are equipped with blocks 10 made from insulating plastic material, placed between the support 3 and the exchanger 6.

The blocks 10 may comprise a roughly flat base 11 having a shape corresponding to that of the end of the fastening lugs 4 of the support 3. It is this base 11 which is placed between the support 3 and the heat exchanger 6. The edge of the base 11 is provided with a rim 12 turned in the opposite direction to the fins and surrounding the end of the lug 4 along the section thereof.

Tongues 13, designed to return on the face of the lug 4 opposite that which is facing the exchanger 6 rise from the rim 12. The tongues 13 therefore ensure the immoblization, of the block 10 on the lug 4. Mounting is performed by causing the sheet of the lug 4 to slide between the base 11 on the one hand and the tongues 13 on the other hand.

The block 10 is locked onto the lug 4 by means of another tongue 14 stamped in the base 11 and projecting therefrom on the side of the rim 12 and of the tongues 13. This tongue 14 cooperates with a tongue 15 stamped in the lug 4 and projecting therefrom towards the base 11 of the block 10. When the block 10 is slid on the lug 4, the tongue 14 has sufficient elasticity to retract during the passage of the protruding tongue 15. Then, when this tongue 15 has passed, the tongue 14 springs back and latches behind the tongue 15, ensuring the locking of the block on the fastening lug.

The base 11 of the block 10 also comprises, on its side facing the heat exchanger 6, a protruding rib 16 having the same hooking function as the rib 8 of the first embodiment.

Finally, on the same side as the rib 16, the base 11 forms a protruding sleeve 17. The sleeve 17 is provided with a hole 18 passing through the base 11 in the alignment of the hole 7 of the lug 4, for the passage of screws for fastening the motor 1 onto the exchanger 6, The sleeve 17 is engaged in a recess provided in the fins of the exchanger 6 and forms a distance sleeve to prevent crushing of the latter during the tightening of the attachment screws.

Just like the coating 9, the base 11 of the blocks 10 prevents corrosion which would be caused by direct contact between the motor support 3 and the heat exchanger 6.

What is claimed is:

1. A unit comprising an accessory fixed to a heat exchanger comprising fins made of metal, the accessory being provided with at least one bearing surface designed to come to rest on the fins, wherein the bearing surfaces are formed on a steel accessory support integral with the accessory, and wherein an electrically insulating material is disposed between the bearing surfaces and the fins of the exchanger, the electrically insulating material and the at least one bearing surface having an opening formed therethrough which cooperate to receive a screw for securing the unit to the heat exchanger at a first location, the electrically insulating material further having a protruding rib formed therein and disposed separately from the hole to further secure the bearing surface to the heat exchanger at a second location.

2. The unit of claim 1, in which the electrically insulating material is produced in the form of an electrically insulating coating covering the at least one bearing surface.

3. The unit of claim 2, in which the electrically insulating material is of the paint or varnish type, which is applied in the liquid state.

4. The unit of claim 2, in which the electrically insulating coating occurs in the form of an adhesive bonded to the at least one bearing surface.

5. The unit of claim 1, in which the electrically insulating material is made in the form of at least one block made of plastic material fixed to the at least one bearing surface.

6. The unit of claim 5, in which the at least one block is fixed to the at least one bearing surface by latching means cooperating on the at least one block and on the accessory support.

7. The unit of claim 6, wherein the at least one block comprises the protruding rib.

8. The unit of claim 5, in which the at least one block comprises a sleeve for engaging a recess provided in the fins of the exchanger between the tubes, so as to form at least one spacer sleeve portion.

9. A motor vehicle comprising a heat exchanger including the unit of claim 1.

10. A device for attaching an accessory to a heat exchanger comprising a support being attached to an accessory at one end and having a fastening lug at the other end; the fastening lug having a securing means for securing the fastening lug to a heat exchanger, and the fastening lug having a metal bearing surface for resting on the heat exchanger wherein an electrically insulating material is disposed between the metal bearing surface and the heat exchanger, the electrically insulating material and the metal bearing surface having an opening formed therethrough which cooperate to receive a screw for securing the unit to the heat exchanger at a first location, the electrically insulating material further having a protruding rib formed therein and disposed separately from the hole to further secure the bearing surface to the heat exchanger at a second location.

11. The device according to claim 10 wherein the protruding rib for gripping the heat exchanger by causing an indentation to the surface of the heat exchanger when the fastening lug is secured to the heat exchanger.

12. The device according to claim 10 wherein the electrically insulating material is an insulating coating applied to the bearing surface.

13. The device according to claim 10 wherein the electrically insulating material comprises a member configured to mate with the fastening lug, said member having an attachment means for attaching the member to the fastening lug.

14. The device according to claim 13 wherein the attaching means comprises a hook for gripping the fastening lug.

15. The device according to claim 13 wherein the attaching means comprises a first latching means for cooperating with a second latching means on the fastening lug.

16. The device according to claim 13 wherein the member defines a bottom wall for resting on the heat exchanger, the bottom wall having the protruding rib formed thereon for gripping the heat exchanger by causing an indentation to the surface of the heat exchanger when the fastening lug is secured to the heat exchanger.

17. The device according to claim 13 wherein the member further comprises a sleeve configured to engage with a recess provided in the heat exchanger.

18. A motor vehicle comprising a heat exchanger including the device of claim 10.

* * * * *